Oct. 9, 1951  M. CLOUGH  2,570,524
PIE AND CAKE PAN
Filed Jan. 3, 1949
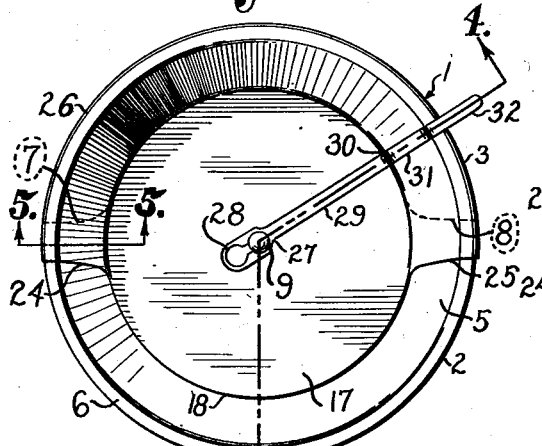
Fig. 1.
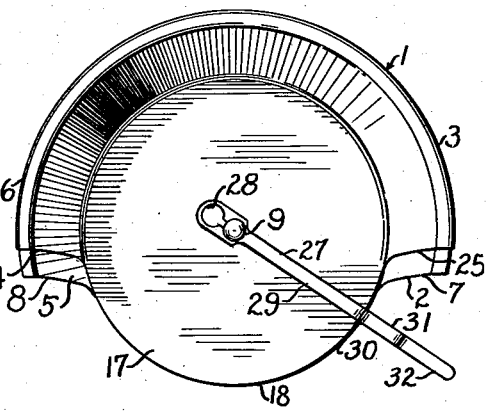
Fig. 2.
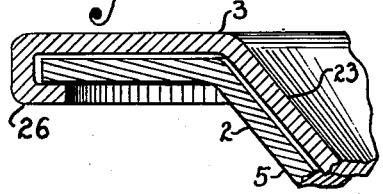
Fig. 3.
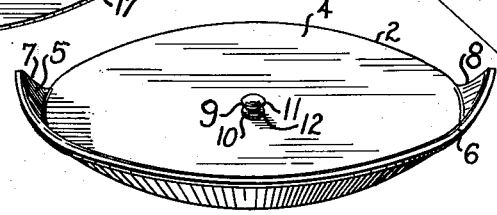
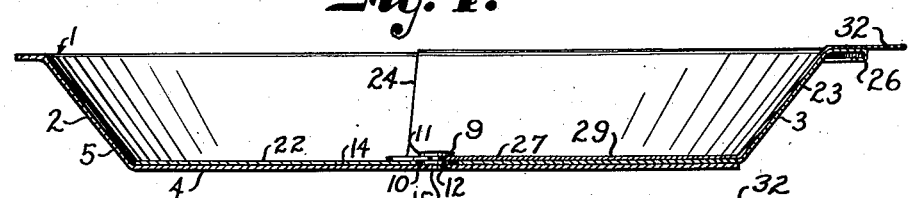
Fig. 5.
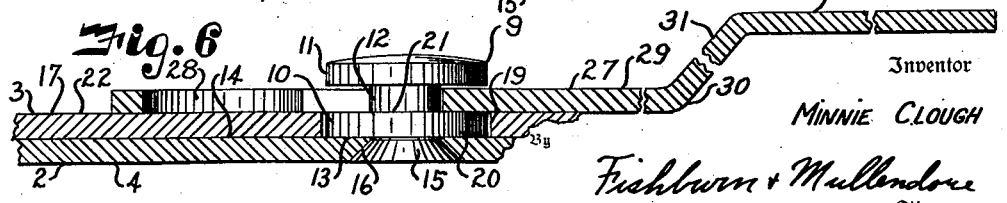
Fig. 4.
Fig. 6.
Inventor
MINNIE CLOUGH
Fishburn & Mullendore
Attorneys Patented Oct. 9, 1951

2,570,524

UNITED STATES PATENT OFFICE 2,570,524

PIE AND CAKE PAN

Minnie Clough, Kansas City, Mo.

Application January 3, 1949, Serial No. 68,892

2 Claims. (Cl. 99—429)

This invention relates to baking pans for pies, cakes and the like and more particularly to pie and cake pans formed of relatively rotatable sections for facilitating removal of the baked article, said sections being separable for cleaning.

The objects of the invention are to provide a pie and cake pan formed of rotatable sections adapted to be moved to open the side of the pan for removal of the article baked therein; to provide a pan of this character which supports all of the bottom of the article when the side of said pan is open; to provide a knife in the pan for separating the baked article from the pan sections, said knife being pivoted at the axis of rotation of said sections and forming a key for retaining the sections in assembled condition; to provide a pan having relatively rotatable separable sections, one nesting in the other and each having circular bottoms and complementary side wall and rim portions adapted for engagement of the ends of said wall and rim portions to form a complete peripheral wall around the pan whereby rotation of one section moves the respective wall into overlying relation to the other wall to open one side of the pan and permit free removal of the baked article therefrom, said sections being separable for access to all surfaces for cleaning; to provide a pan of this character which is economical to manufacture, easily assembled and disassembled and of neat, durable construction; and to provide a pan which has movable sections for facilitating removal of the baked article therefrom and complete separation of the various parts for access to all surfaces for cleaning and maintaining the pan in a sanitary condition.

In accomplishing these and other objects of the present invention, I have provided improved details of structure, the preferred forms of which are illustrated in the accompanying drawings, wherein:

Fig. 1 is a plan view of a pan embodying the present invention showing the sections in assembled condition and in their relatively closed position.

Fig. 2 is a plan view with the sections rotated to form an open side to the pan.

Fig. 3 is a disassembled perspective view of the pan sections and knife therefor.

Fig. 4 is a detail sectional view taken on the line 4—4, Fig. 1.

Fig. 5 is an enlarged detail section through the rims of the pan sections taken on the line 5—5, Fig. 1.

Fig. 6 is an enlarged detail section through the pivot of the pan section, particularly illustrating the structure for retaining the sections in assembled condition.

Referring more in detail to the drawings:

1 designates a pie and cake pan of circular form comprising sections 2 and 3. The section 2 has a circular bottom 4 provided with an upwardly inclined side wall 5 which terminates in an outwardly directed flange 6 preferably disposed in substantially parallel relation to the bottom 4. The wall 5 and flange 6 are cut as at 7 and 8 whereby said wall and flange extend peripherally of the bottom somewhat more than a half circle. Located at the radial center of the bottom is an upwardly extending pin 9 consisting of spaced collars 10 and 11 connected by a shank 12 of reduced diameter, the lower face 13 of the collar 10 being adapted to rest on the upper face 14 of the bottom member 4. The pin is suitably secured to said bottom member as, for example, by means of an axial extension 15 adapted to extend into a countersunk bore 16 which preferably slopes outwardly and downwardly from the upper face of the bottom 4 whereby the extension 15 may be riveted or otherwise suitably peened into the bore 16 to secure the pin to the bottom.

The pan section 3 is adapted to nest in the section 2 and comprises a bottom 17 of circular form and of suitable diameter whereby the edges 18 of said bottom substantially engage the section 2 at the point of connection of the wall 5 with the bottom 4. At the radial center of the bottom 17 is an aperture 19, coaxial with the pivot pin 9 and of suitable size to pass over the collar 11 and substantially engage the peripheral surface 20 of the collar 10 whereby the section 3 is rotatable on said pivot pin 9. The thickness of the bottom 17 is preferably the same as the thickness of the collar 10, whereby the upper surface 21 of said collar is in the same plane as the upper surface 22 of the bottom member 17.

Integral with the bottom 17 and peripherally thereof is an upwardly inclined side wall 23 which terminates as at 24 and 25 whereby said side wall forms somewhat more than a half circle and when the sections are positioned as shown in Fig. 1, the end portions of the side wall 23 engage and overlie the end portions of the side wall 5. Extending outwardly from the periphery of the wall 23 is a substantially U-shaped flange 26 adapted to telescope the flange 6 on the wall 5 of the pan section 2 when the pan sections are in either of the positions shown in Fig. 1 or 2.

The pan sections are held in assembled condition for relative rotative movement by a member 27 having a keyhole aperture 28, the large portion of which is of suitable size to pass over the collar 11 on the pivot pin 9, the slot portion of the keyhole aperture being substantially the same width as the shank 12 and the member 27 being slightly less in thickness than the spacing between the adjacent faces of the collars 10 and 11, whereby when the member 27 is applied to the pivot pin and moved to locate the shank 12 in the slot portion of the aperture 28 the member 27 will key the pan sections together. The member 27 preferably includes a section 29 arranged radially of the pan close to the upper surface 22 of the pan section 23, the member 29 being turned upwardly as at 30 to provide a portion 31 substantially engaging the inner surface of the wall 23, the upper end of the portion 31 being turned outwardly adjacent the flange 26 to form a handle 32 for rotation of the member 27 about the pivot pin 9. The side edges of the portions 29 and 31 are preferably bevelled to form relatively sharp edges whereby said portions act as blades for separating the baked articles from the portions of the pan sections.

The assembly and use of the pie pan is as follows:

The section 3 is placed over the section 2 and the aperture 19 sleeved over the pivot pin 9. There is some flexibility in the pan sections, therefore said sections may be rotated with one end of the flange 26 above the flange 6 until the opposite ends of said flanges are in alignment whereby the flange 6 will telescope into the flange 26 and continued rotation will move the pan sections until there is an opening between the wall thereof. In this position the adjacent faces of the bottoms 4 and 17 in contact. The aperture 28 in the member 27 is then sleeved over the collar 11 whereby the member 27 aligns with the spacing between the collars 10 and 11. The member 27 is then moved longitudinally whereby the shank 12 enters the slot portion of the aperture 28 as shown in Figs. 1, 2 and 6. The member 27 is then rotated to a position such as shown in Fig. 1 whereby the portion 31 engages the inner face of the wall 23. The pan sections 2 and 3 are then rotated to telescope the spaced ends of the flanges 6 and 26 to position the pan sections as shown in Fig. 1 in what may be termed a closed position. The pan is then ready for use, that is for receiving the raw material for an article to be baked.

After baking, the operator grasps the handle 32 of the member 27 and rotates same about the pivot pin 9, the blade portions 29 and 31 serving the baked article from the bottom and side walls of the pan sections. This is preferably done while the baked article, such as a pie, is still hot. The pan sections are then rotated about the pivot pin 9 until the side wall 23 is positioned over the side wall 5 as shown in Fig. 2, with the member 27 and blade portion positioned over the side wall and flange portion and since the baked article has been separated from the bottom and walls of the pan, said baked article may be slid through the open side onto a plate or the like without damage to the crust of a pie or other baked article.

The circular bottom of both sections assures even distribution of heat over the bottom of the baked article and also provides support for the entire article as it is being handled preparatory to removing same through the open side of the pan, eliminating any possibility of the pie or the like breaking over the edge of the bottom. After the baked article is removed, the member 27 is rotated to a position shown in Fig. 2, and moved radially to align the large portion of the keyhole aperture 28 with the collar 11 whereby said member 27 may be lifted from the pivot pin. The pan sections are then rotated to close the open side and as the ends of the flanges 6 and 26 approach to close the gap they are sprung slightly whereby the flange 26 wil ride over the flange 6. Continued rotation will disengage the opposite ends of the flanges whereby the section 3 may be removed from the section 2. Obviously all of the surfaces of the pan sections 2 and 3, and the member 27 may be thoroughly cleaned. This accessibility of all the surfaces is considered important as the parts of the structure may be thereby easily maintained in a sanitary condition.

What I claim and desire to secure by Letters Patent is:

1. A pie and cake pan of the character described comprising, two complementary members connected with each other at the pan rim for rotary movement about the center of the pan as the axis, each of said members having circular bottoms one resting on the other in covering relation thereto, the uppermost bottom having an aperture at the axis thereof, pivot means secured to the lowermost bottom at the axis of the members and extending through said aperture for separably connecting the bottoms for relative rotary movement, a collar on the pivot means spaced from the bottom of the upper member, and knife means having a keyhole aperture removably engaged on said pivot means between the collar and upper member bottom for retaining the bottoms in engagement whereby removal of said knife means permits bodily separation of the members, said knife means engaging the bottom and rotatable about the pivot means for separating articles from the pan.

2. A pan of the character described comprising, a pair of separable pan sections each having circular bottoms, one of which rests on the upper surface of the other bottom in covering relation thereto, complementary peripheral walls on said bottoms of sufficient arcuate length for the ends of said walls to be in continuously overlapping relation, interengaging flanges on the peripheries of said walls, the uppermost of said bottoms having an axial aperture therein, pivot means secured to the other bottom and extending through said axial aperture, and knife means removably and rotatably mounted on the pivot means in engagement with the upper surface of the apertured bottom for holding the pan sections together for relative rotary movement about the center of the pan as the axis whereby relative rotation of said pan sections to position the walls in substantially complete overlying relation forms an open side through which an article in the pan may be slid for removal, said open side having an arcuate length slightly less than one half the periphery of the pan bottoms, removal of said knife means from the pivot means releasing the pan sections for bodily separation.

MINNIE CLOUGH.

REFERENCES CITED

The following references are of record in the file of this patent:

UNITED STATES PATENTS

| Number | Name | Date |
| --- | --- | --- |
| 471,116 | Hays et al. | Mar. 22, 1892 |
| 1,191,672 | Crosby | July 18, 1916 |
| 1,518,973 | Edwards | Dec. 9, 1924 |
| 1,757,655 | Dillow | May 6, 1930 |
| 1,979,940 | Janssens | Nov. 6, 1934 |
| 1,997,872 | Nicolette | Apr. 16, 1935 |
| 2,297,914 | Pino | Oct. 6, 1942 |

FOREIGN PATENTS

| Number | Country | Date |
| --- | --- | --- |
| 59,943 | Sweden | Sept. 24, 1924 |